United States Patent
Katz et al.

(10) Patent No.: US 8,896,602 B2
(45) Date of Patent: *Nov. 25, 2014

(54) APPARATUS AND METHOD FOR FINDING VISIBLE POINTS IN A POINT CLOUD

(71) Applicant: Technion Research and Development Foundation Ltd., Haifa, IL (US)

(72) Inventors: Sagi Katz, Haifa, IL (US); Ayellet Tal, Haifa, IL (US)

(73) Assignee: Technion Research and Development Foundation Ltd., Haifa (IL)

( * ) Notice: Subject to any disclaimer, the term of this patent is extended or adjusted under 35 U.S.C. 154(b) by 0 days.

This patent is subject to a terminal disclaimer.

(21) Appl. No.: 13/960,852

(22) Filed: Aug. 7, 2013

(65) Prior Publication Data

US 2013/0321421 A1    Dec. 5, 2013

Related U.S. Application Data (60) Division of application No. 12/471,381, filed on May 24, 2009, now Pat. No. 8,531,457, which is a continuation of application No. PCT/IL2007/001472, filed on Nov. 29, 2007.

(60) Provisional application No. 60/867,725, filed on Nov. 29, 2006.

(51) Int. Cl.
| | |
|---|---|
| G06T 15/10 | (2011.01) |
| G06T 15/20 | (2011.01) |
| G06T 15/40 | (2011.01) |
| G06T 15/60 | (2006.01) |

(52) U.S. Cl.
CPC ........... *G06T 15/20* (2013.01); *G06T 15/40* (2013.01); *G06T 15/60* (2013.01); *G06T 2210/12* (2013.01)
USPC .......................................................... 345/427

(58) Field of Classification Search
CPC ................. G06T 15/20; G06T 15/40
USPC .......................................................... 345/427
See application file for complete search history.

(56) References Cited

U.S. PATENT DOCUMENTS

| | | | | |
|---|---|---|---|---|
| 5,546,515 | A * | 8/1996 | Mochizuki | 345/606 |
| 6,266,064 | B1 * | 7/2001 | Snyder | 345/421 |
| 2002/0164067 | A1 * | 11/2002 | Askey et al. | 382/154 |
| 2007/0078636 | A1 * | 4/2007 | Elsberg et al. | 703/2 |
| 2007/0103460 | A1 * | 5/2007 | Zhang et al. | 345/419 |
| 2007/0247460 | A1 * | 10/2007 | Smitt et al. | 345/427 |

OTHER PUBLICATIONS

Katz et al.; "Mesh segmentation using feature point and core extraction"; The Visual Computer, Springer Berlin/Heidelberg, vol. 21, Nos. 8-10, Sep. 2005; pp. 649-658.*

Leymarie et al.; "Computation of the Shock Scaffold for Unorganized Point Clouds in 3D"; Computer Vision and Pattern Recognition, 2003; Proceedings. 2003 IEEE Computer Society Conference on vol. 1, Jun. 20, 2003, pp. 823-824.*

He et al.; "A Next-Best-View Method With self-termination in Active Modeling of 3D Objects"; Intelligent Robot and Systems; 2006 IEEE/RSJ International Conference on Oct. 2006, pp. 5346-5348.*

Dobashi et al.; "Radiosity for point-sampled geometry"; Computer Graphics and Applications, 2004, PG 2004. Proceedings. 12th Pacific Conference on Oct. 2004, pp. 152-159.*

* cited by examiner

*Primary Examiner* — Kee M Tung
*Assistant Examiner* — Peter Hoang
(74) *Attorney, Agent, or Firm* — Soroker—Agmon (57) ABSTRACT

A method for determining an optimal location for positioning an image capturing device within a volume, the method including, obtaining a plurality of points to be visible from the image capturing device, performing inversion on points located in the vicinity of the plurality of points thus creating a computerized inversed object, each point in the vicinity of the plurality of point is translated to a corresponding point in the computerized inversed object, defining a convex hull of the inversed object, determining if a point of the plurality of points is visible from the viewpoint according to the position of its corresponding point on the convex hull relative to its neighbor points, repeating said determining for multiple locations within the volume, determining whether a predetermined set of points is visible from each location, selecting the optimal location of the image capturing device based on the results of said repeated determining.

12 Claims, 7 Drawing Sheets

APPARATUS AND METHOD FOR FINDING VISIBLE POINTS IN A POINT CLOUD

RELATED APPLICATIONS

This application claims priority under 35 U.S.C. 120 as a divisional of application Ser. No. 12/471,381 dated May 24, 2009. The disclosure of which is incorporated herein by reference. Application Ser. No. 12/471,381 claims priority from provisional application No. 60/867,725 filed Nov. 27, 2006, which is hereby incorporated by reference.

BACKGROUND OF THE INVENTION

1. Field of the Invention

The present invention relates to computational geometry in general and to determining visibility of points from a predefined point of view in particular.

2. Discussion of the Related Art

Computer graphics employ processing units to determine visibility of points. Visibility determination is the process of determining whether a particular point in space is visible from a specific point of view. Determining the visibility of a surface of an object quickly and efficiently has been a fundamental problem in computer graphics.

Determining visible points is useful for indicating field of view from a specific point, for defining shadow casting, for the gaming industry, for the security industry and the like. For example, finding visible points may result in a more clearly visible object enabling to see better the particular features, curves and shapes of the object. In an exemplary case, a computerized image depicting the face of a person can be processed such that the human face contours are visibly shown after the processing. Such processing may be changing the color of some points in case they are not visible, hence distinguishing visible points from non-visible points in the image. After changing the color of the points that are visible from a specific point of view, a person watching the image can then determine if the human face is shown or if the back of the human head is shown.

A point cloud is a set of three-dimensional points describing the outlines or surface features of an object that may be produced by a 3D digitizer. Alternatively, point cloud can also represent some properties in N dimensional space. Evidently, points cannot occlude one another unless they are collinear with the viewpoint. As a result, points in the point cloud are not considered hidden. However, once the surface from which the points are sampled is reconstructed (in 2D or 3D), it is possible to define which of the points are visible to a viewer having a predetermined point of view. A point cloud inherently contains information from which it is possible to extract the visibility of the points to a viewer having a predetermined point of view.

Current solutions achieve points visibility by constructing a surface from the points in the point cloud, and using the surface to determine which of the is points is visible. Reconstruction of the surface from the points requires considerable time and computation resources.

In addition, visibility of point clouds has been addressed in the context of rendering images or representations of objects. For example, rendering visibility maps that indicates whether one point can be viewed from another before the data is actually required. This is done by a matrix having values representing the level of visibility from a viewpoint. This way, runtime of O(l) is required to receive an answer concerning visibility and runtime of at least $O(n^2)$ is required to prepare the matrix. No solutions having runtime of O(n log n) are suggested in the art. Moreover, camera rotation or change in the field of view requires time-consuming visibility recalculation.

Therefore, it is desirable to provide a method and apparatus for efficiently determining the visible points without constructing a surface of points. Further, such method and apparatus are desired to be implemented using less memory, low complexity (e.g. O(n log n)) and be independent of camera rotation.

SUMMARY OF THE PRESENT INVENTION

The subject matter discloses a method for determining points that are visible from a specific point of view. The method comprises a step of inverting at least a portion of the image thus generating an inversed object. Each point in the object has a parallel point in the inversed object. The next step is determining the convex hull of the inversed object. Each point in the convex hull has a parallel point in the original object that is likely to be visible from the point of view. In some cases, additional conditions are applied on the points in the convex hull. For example, the size of the angle between two neighboring points to the examined point in the convex hull.

Determining visible points is also useful for determining shadow casting since the viewpoint may also function as a light source. Hence, visible points are illuminated by a light source located in the viewpoint. Performing the convex hull requires runtime of O(n log n) while other methods for determining is visible points require runtime of $O(n^2)$. An image-detecting device such as a camera preferably takes the image in case it is a 2D representation. A memory unit within the camera or within a computing device to which the image is sent or copied preferably performs the process of determining the visible points.

The subject matter discloses a method of determining whether a specific point in a computerized image is visible from a viewpoint; said image is represented as a point cloud, the method comprising: performing inversion on points located in the vicinity of the specific point thus creating a computerized inversed object, each point in the vicinity of the specific point is translated to a parallel point in the computerized inversed object; defining a convex hull of the inversed object; determining if the specific point is visible from the viewpoint according to the position of its parallel point on the convex hull relative to its neighbor points.

The method may further comprise a step of applying an at least one condition on the parallel point of the specific point before determining that the specific point is visible.

The condition is comparing the angle between the parallel point of the specific point and two neighboring points in the point set composing the convex hull to a predetermined value; a line between the point and the viewpoint divides the angle. The method further comprises a step of coloring the specific point in case it is determined visible from the viewpoint.

The method further comprising a step removing the specific point from the computerized image in case said point is not determined visible from the viewpoint.

The method further comprises determining shadow casting of the specific point by determining the point is visible from a viewpoint representing a light source. The inversion is a spherical inversion.

It is another aspect of the subject matter to disclose a method for determining an optimal location for positioning an image capturing device within a volume, the method comprising: obtaining a plurality of points to be visible from the image capturing device; performing inversion on points located in the vicinity of the plurality of points thus creating a computerized inversed object, each point in the vicinity of the plurality of point is translated to a parallel point in the computerized inversed object; defining a convex hull of the inversed object; determining if a point of the plurality of points is visible from the viewpoint according to the position of its parallel point on the convex hull relative to its neighbor points; repeating said determining for multiple locations within the volume, determining whether a predetermined set of points is visible from each location; selecting the optimal location of the image capturing device based on the results of said repeated determining.

The method comprises determining visibility of the plurality of points by indicating the number or percentage of visible points of the plurality of points is higher than a threshold.

The number of points of the plurality of points that are visible from the determined location is higher than the number of points in the plurality of points that are visible from other locations.

The subject matter discloses a method for determining the amount of light falling on an at least one point using the method of claim 1, the method comprises: determining direct illumination by determining visibility of the at least one point from a first set of points acting as a light source; locating a second set of points that are determined to be visible from the first set of points; determining indirect illumination by determining visibility of the at least one point from the second set of points acting as a source of reflecting light; setting the amount of light falling on the at least one point based on it being directly illuminated or indirectly illuminated.

BRIEF DESCRIPTION OF THE DRAWINGS

Exemplary non-limited embodiments of the disclosed subject matter will be described, with reference to the following description of the embodiments, in conjunction with the figures. The figures are generally not shown to scale and any sizes are only meant to be exemplary and not necessarily limiting. Corresponding or like elements are optionally designated by the same numerals or letters.

DETAILED DESCRIPTION OF THE PREFERRED EMBODIMENT

The disclosed subject matter describes a novel and unobvious method for determining visible points in a point cloud referring to an object.

In a computerized image containing an object, it is complicated to determine whether a specific point or portion of an image is visible from a predetermined point of view. A captured image may be insufficiently clear and a person watching the image or a computer handling watching the image cannot define important data related to the image. For example, determining whether a portion of the image is visible from a specific point of view or whether a point in the image may be illuminated by a light source located at another point, or whether an obstacle, such as another object, occludes them.

The technical solution to the above-discussed problem is performed in a two-step algorithm. The first step is inversing an object in the image, a portion of the image, or the vicinity of a specific point. After an object is inverted, each point in the object has a parallel point in the inversion. Then, having an inversed shape, the next step is obtaining a convex hull of the inversed shape. The points in the original shape that have parallel points in the convex hull are likely to be visible.

Figure 1:
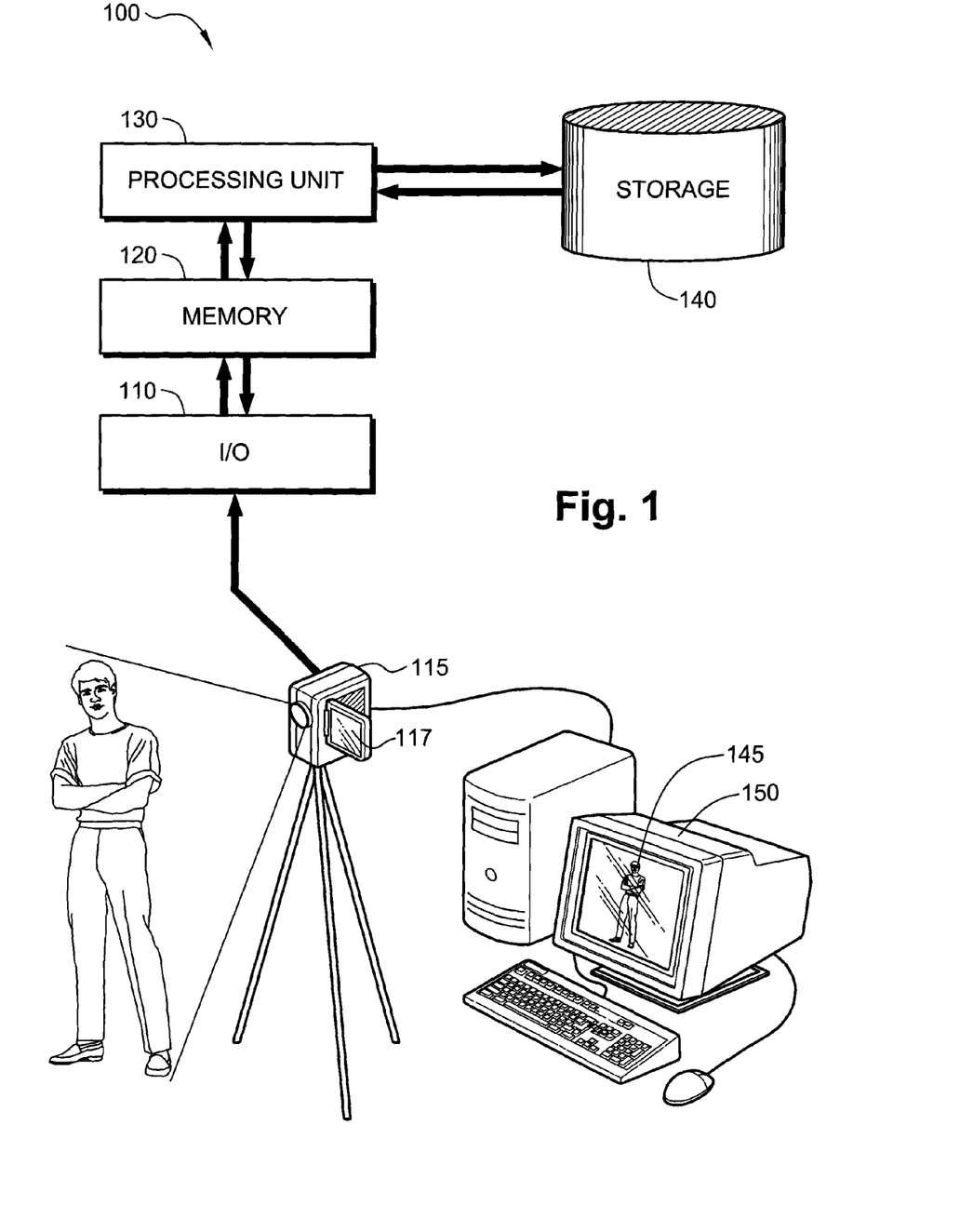
FIG. 1 shows computational elements implementing a method for determining visible points from a viewpoint, in accordance with an exemplary embodiment of the disclosed subject matter.

FIG. 1 illustrates a computerized environment 100 implementing methods for determining the visibility of points in a computerize image represented by a point cloud, according to an exemplary embodiment of the subject matter. The point cloud can be acquired from other sources such as 3D scanners, stereo or range cameras, databases and the like. Assuming each point in a point cloud can be distinguished by coordinates or by its location in the point cloud, such data is preferably stored prior to the process of finding the visible points. Computerized environment 100 comprises an I/O device 110 for capturing an image using an imaging device 115 capturing a captured image 117. The captured image 117 is transmitted to a memory 120, where a processing unit 130 handles the image. Processing unit 130 performs inversion on at least a portion of the captured image, for example, a spherical inversion. Multiple inversions and the rules concerning the resolution and other characteristics related to the inversion may be stored in storage 140. Each point in the original object from captured image 117 has a parallel point in the inversed object. Next, processor 130 determines a convex hull of the inversed object. A point in captured image 117 is likely to be visible in case its parallel point is part of the point set composing the convex hull of the inversed image. After determining visible points, some of the pixels in the image may be colored or otherwise processed to better define the visible points from the non-visible points. In an exemplary embodiment of the subject matter, the non-visible points are removed from captured image 117 to generate a processed image 145. In other embodiments, processed image 145 may modify data related to visible points, such as enlarging visible points, highlighting visible points and the like. Processed image 145 may be displayed on monitor 150. The results may be used from further computational units or for other applications such as navigation.

One example of inversion is Spherical Flipping as described in Mesh segmentation using feature point and core extraction KATZ, S., LEIFMAN, G., AND TAL, A. 2005. The article was published in Visual Computer 21, 8-10, 865-875, which is hereby incorporated by reference. Another example of an inversion is a simple inversion in which the radius r is inversed into 1/r. Such simple inversion is performed using the equation $$f(x, y) = \frac{1}{x^2 + y^2}(x, y) = \frac{(\cos(\theta), \sin(\theta))}{r}$$

that can be modified into the equation $$f(x, y) = \frac{1}{(x^2 + y^2)^r}(x, y).$$

Typically, when performing an inversion, the computational entity generates an approximately elliptical or spherical with the viewpoint in the center or in one of the focuses of the shape.

Figure 2:
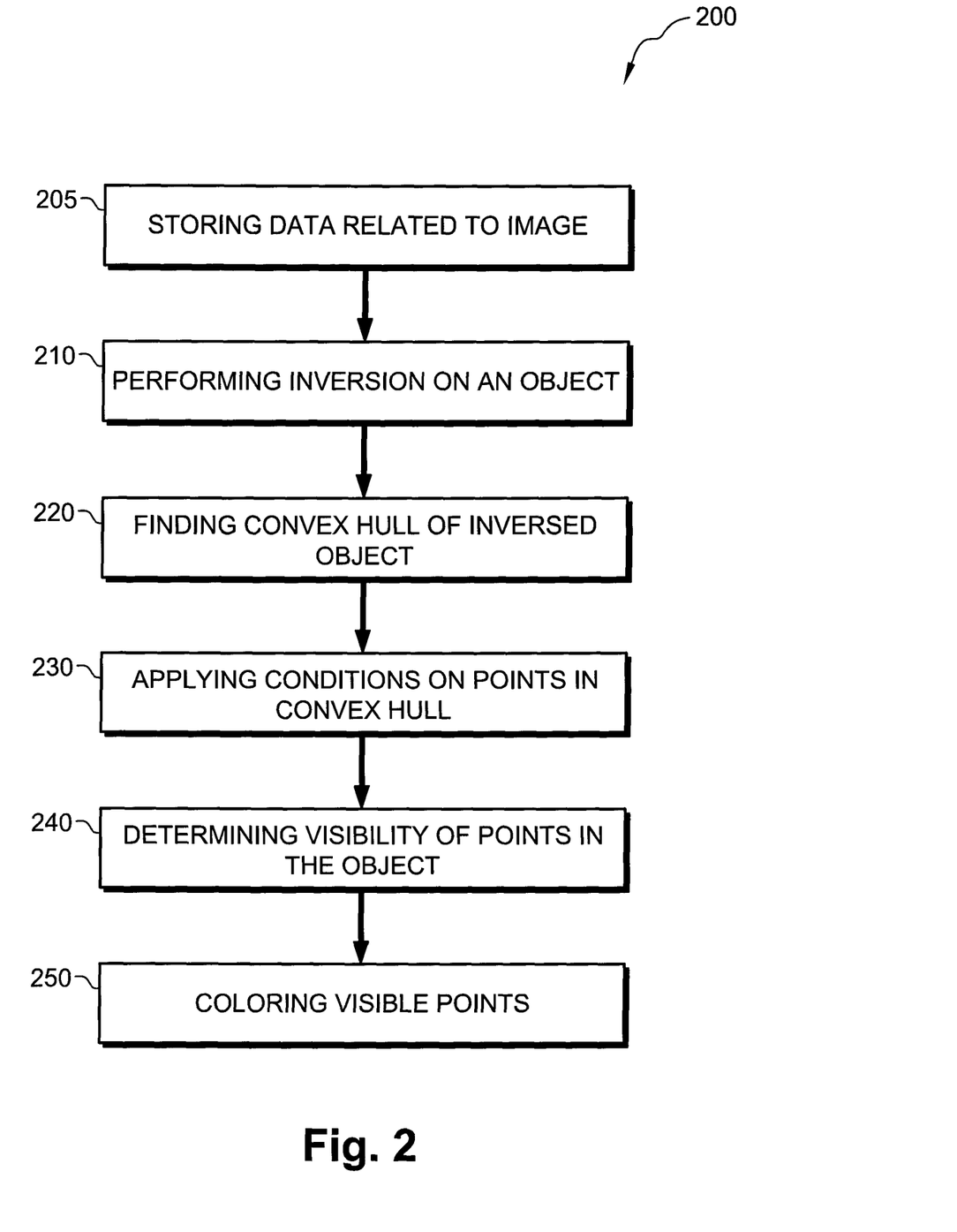
FIG. 2, illustrates a flow chart of a method for determining visibility of points from a viewpoint, in accordance with an exemplary embodiment of the disclosed subject matter.

FIG. 2 is a flow chart of a method of determining visibility of points on an object from a viewpoint, according to an exemplary embodiment of the subject matter. In step 205, data related to the object and the point is stored in storage 140. Such data may be coordinates of the points in the point cloud, the number of points in the point cloud, coordinates of the viewpoint, and the like. Next, in step 210, the application handling the process of determining visibility of points performs inversion on the object. As a result of the inversion, a new set of points is generated. In an exemplary embodiment, the number of points in the new set of point is equal to the number of points in the point cloud representing the object. Preferably, each point in the point cloud representing the object has a parallel point in the new set of point related to the inversed object. On step 220, a convex hull is defined from the inversed object. In one embodiment of the subject matter, all the points that have parallel points in the convex hull of the inversed object are visible from the viewpoint. In other embodiments, as shown on step 230, other conditions are applied to the points that have parallel points in the convex hull before determining visibility. One example for a condition applied on a point is determining whether the angle between the parallel point in the convex hull and the two neighboring points in the hull is lower or higher than a threshold. A line between the parallel point and the viewpoint divides the angle. Once the condition is satisfied, on step 240 the application determines whether the point is visible from a specific viewpoint. On step 250, the visible points are colored when shadow casting is performed. In some exemplary embodiments, the level of visibility may be determined as a function of the portion of the point occluded by other points in the point cloud. Hence, visible points may be colored in a color different from non-visible points.

Figure 3:
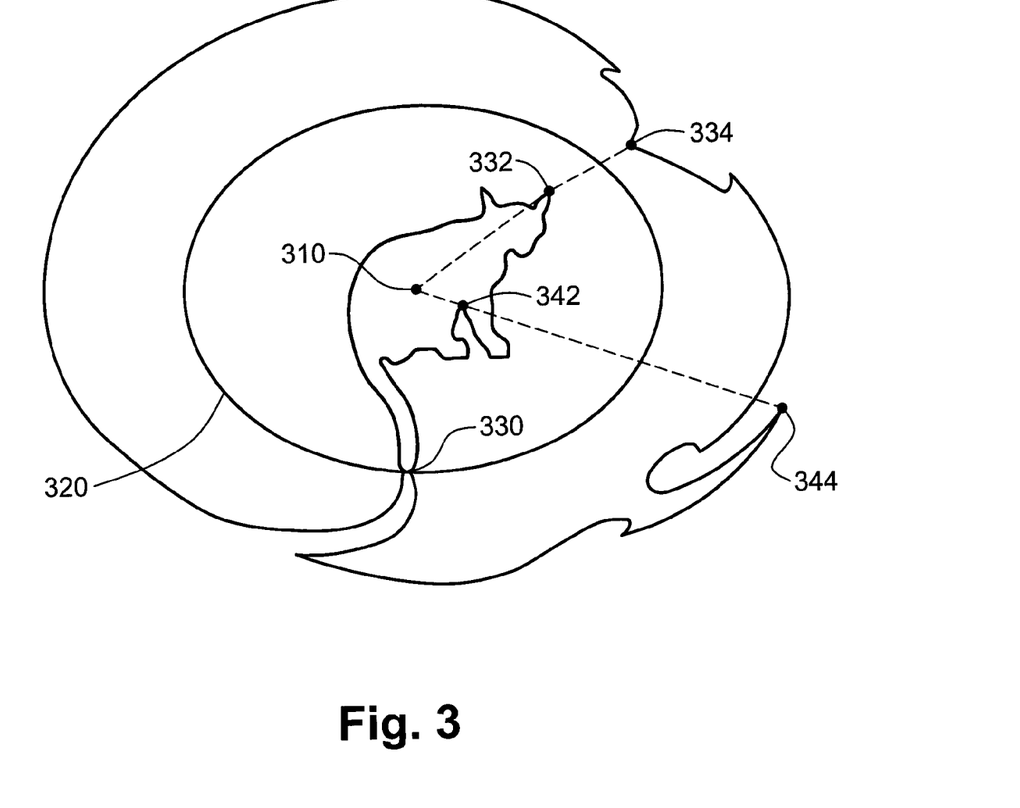
FIG. 3 is an illustration of a spherical inversion of a cat, in accordance with an exemplary embodiment of the disclosed subject matter.

FIG. 3 illustrates a spherical inversion according to an exemplary embodiment of the subject matter, in which a cat-shaped circumference surrounding a viewer located at a viewpoint in the center 310 of approximate sphere 320. The circumference is inversed outside in an approximate sphere 320 having center 310. The result of this specific inversion is that each point that assembles the cat-shaped circumference has a parallel point outside approximate sphere 320. In FIG. 3, the article surrounding the object is approximate sphere 320. In some inversions, the parallel points may reside within the article surrounding the object. In spherical inversion, a parallel point resides on the same line leading from center 310 to a point in the original object that was inverted. Further, the distance between an original point on the cat-like circumference of the object to approximate sphere 320 and the parallel point of the same original point to approximate sphere 320 is equal or has a constant ratio. Each point on the cat is inside approximate sphere 320, the parallel points are outside the sphere, for example, the point indicating a portion of the cat's head 332 has a parallel point 334 outside approximate sphere 320, satisfying the conditions described above. In this exemplary embodiment, the distance between point 332 and sphere 320 is equal to the distance between parallel point 334 and sphere 320. It is noted that point 332 is in relative proximity to approximate sphere 320; hence, parallel point 334 is closer to approximate sphere 320 than the parallel points in its vicinity. Similarly, point 342 is relatively far from approximate sphere 320 and close to center 310, parallel point 344 resides in the proximity of the cat's inversion, relative to approximate sphere 320. Approximate sphere 320 may be a circle, elliptical, or combine a polygonal and elliptical shape.

Figure 4:
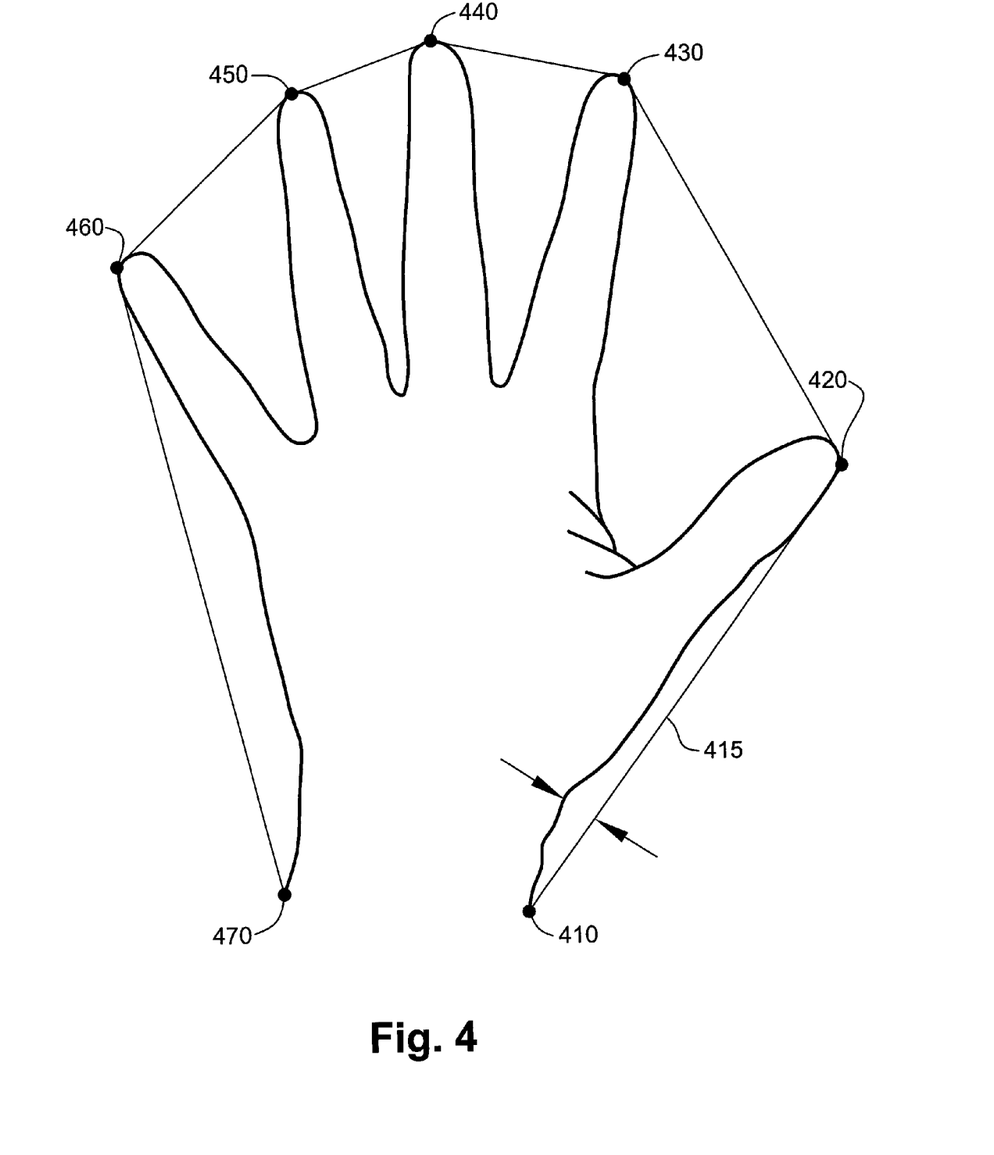
FIG. 4 shows a convex hull of the palm of a hand as disclosed in the subject matter, in accordance with an exemplary embodiment of the disclosed subject matter.

FIG. 4, shows a convex hull of a palm of a hand 400. The term convex hull according to the disclosed subject matter refers to a set of points is the intersection of all convex sets which contain the points. Another definition may be a set of points that may reside on lines generated by tensing a band over an object. An alternative definition may that the convex hull of shape S is the unique convex polygon which contains S and whose vertices are from S A convex hull can also be depicted as points creating a polygon outside an elliptical or semi-elliptical shape or volume, in two or three dimensions.

The result of the convex hull is a set of points. In the exemplary embodiment shown in FIG. 4, points 410, 420, 430 440, 450, 460 and 470 are at least a subset of the points contained within the set of points assembling the convex hull of palm 400. The lines connecting the points in the convex hull belonging to the set of points are outside palm 400. For example, line 415 connects point 410 and point 420. The lines connecting the points are useful in determining which of the points in the point set has a visible parallel point in the object. Hence, data related to the lines, such as directions, coordinates, angles toward a specific point or line, offsets and the like is stored in storage and preferably utilized when determining points' visibility.

Figure 5A:
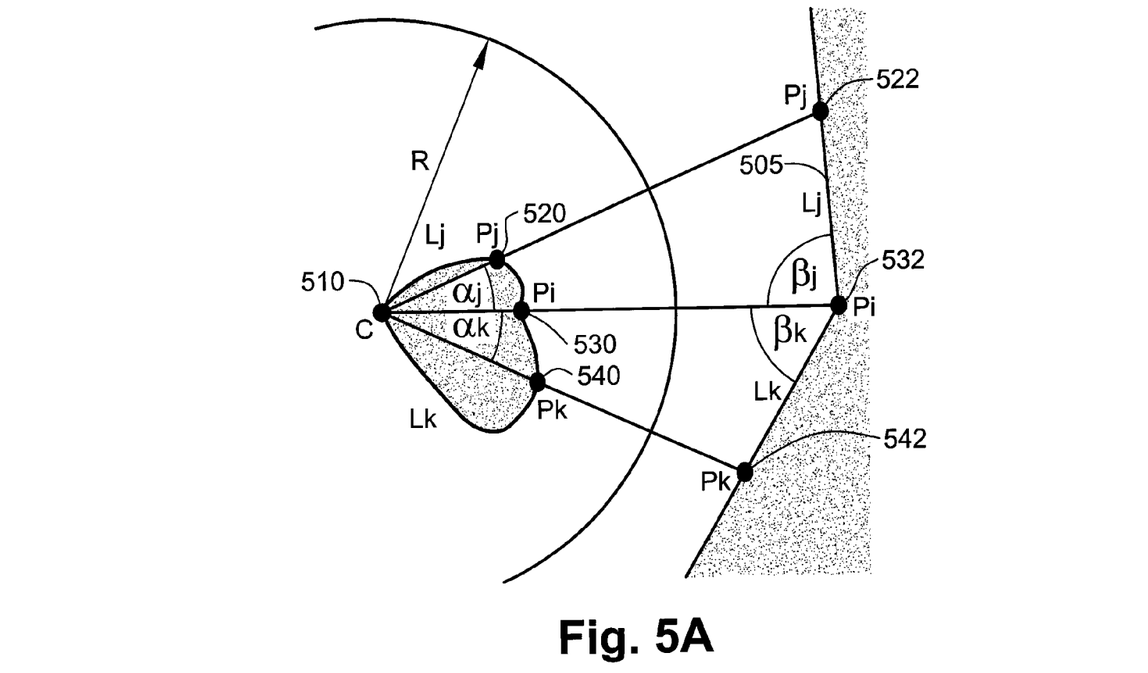
FIGS. 5A and 5B show a convex hull performed on two different shapes performed with the same inversion, in accordance with an exemplary embodiment of the disclosed subject matter.
Figure 5B:
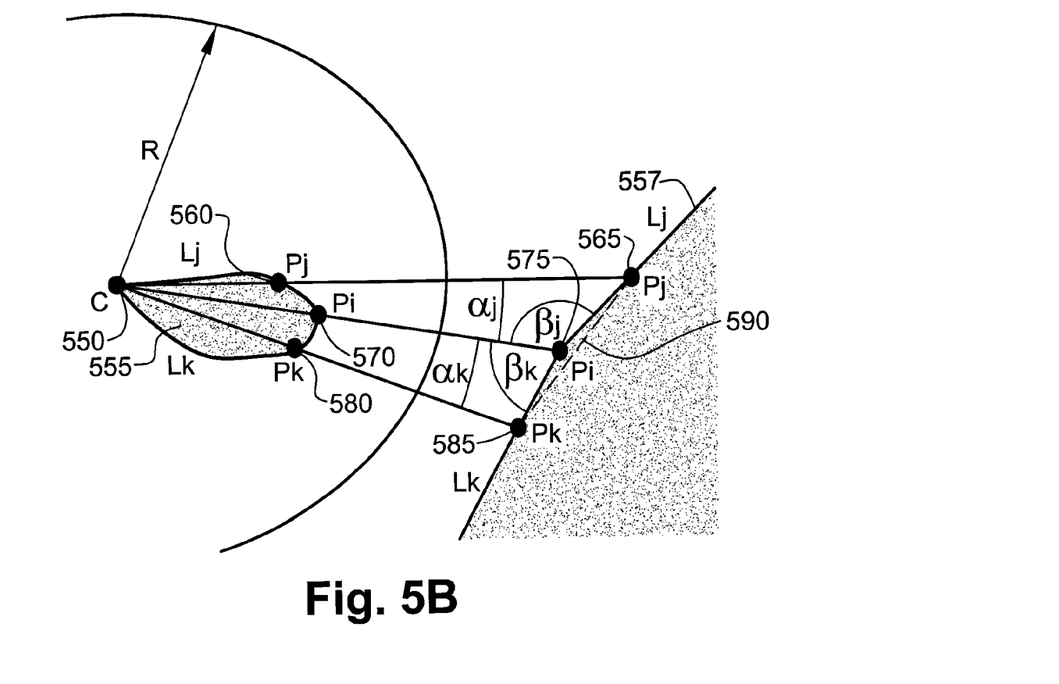

FIGS. 5A and 5B show convex hulls 507, 557, respectively surrounding two different shapes performed with the same inversion. The figures exemplify the difference in determining visible points in contrast to non-visible points from a similar viewpoint 510, 550 using similar inversion methods. FIG. 5A depicts a heart shaped object 503 having center 510. Center 510 is a viewpoint of the points in the point cloud that compose object 503. Parallel point 522 is the point generated by inverting point 520. Parallel point 522 lies on convex hull 507 and as a result, point 520 is likely to be visible from center 510. Similarly, points 530 and 540 are likely to be visible from center 510 since parallel points 532 and 542 reside on convex hull 507. A Point is determined to be visible if the angle between the two neighboring points of the point towards the viewpoint is smaller than a threshold value. In this case, the angle is defined by summing $\beta_k$ and $\beta_j$. The center of the angle is parallel point 532, so the point to be determined visible or not visible is point 530. Since the angle is smaller than 180, which is the threshold in the exemplary embodiment, point 530 is determined visible from center 510. Another way for defining the angle between the two neighboring points and the point that is specifically determined as visible or non-visible is to determine whether the angle points at the viewpoint or not. For example, when determining if point 530 is visible, the angle is centered in point 532, the parallel point of point 530.

FIG. 5B discloses an object 555 viewed from a center 550. The points belonging to object 555 have parallel points in an inversed object 557. For example, point 560 has parallel point 565 that resides within convex hull 557, the inversion of object 555. Similarly, points 570 and 580 of object 555 have parallel points 575 and 585, respectively. In order to determine the visibility of point 570 from center 550, the angle between the two neighboring points of parallel point 575 is calculated and compared to a predetermined threshold. In this case, the threshold is 180 degrees and the angle is bigger than the threshold. It is shown that line 590 that passes between neighboring parallel points 565 and 585, fully resides within inversed object 557. Determining the number or percentage of points contained in the line between the neighboring points that reside in the inversed object and comparing the result to a predetermined threshold is an alternative test in determining that a point in the convex hull is visible.

The steps described above, mainly of inversing the object, determining a convex hull and determining visibility of points that have parallel points on the convex hull are preferably performed by a computerized application. The image processing applications comprise software components written in any programming language such as C, C#, C++, Matlab, Java, VB, VB.Net, or the like, and developed under any development environment, such as Visual Studio.Net, J2EE or the like. It will be appreciated that the applications can alternatively be implemented as firmware ported for a specific processor such as digital signal processor (DSP) or microcontrollers, or can be implemented as hardware or configurable hardware such as field programmable gate array (FPGA) or application specific integrated circuit (ASIC). The methods can also be adapted to be executed on a computing platform, or any other type of computing platform that is provisioned with a memory device 120, a CPU 130, and several I/O ports 110 as noted above.

Figure 6A:
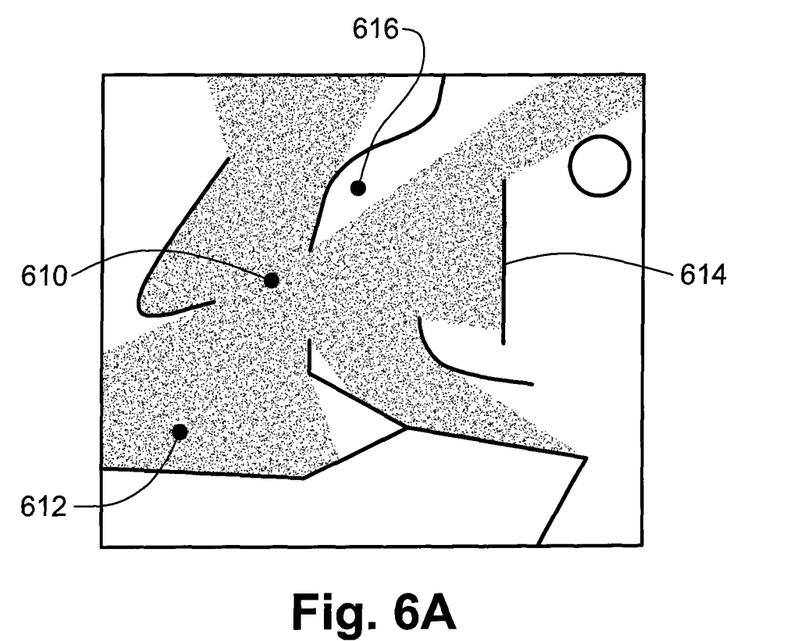
FIGS. 6A and 6B illustrate the visibility of points from different viewpoints, in accordance with an exemplary embodiment of the disclosed subject matter; and, FIG. 7, illustrates shadow casting of an image performed after visibility determination, in accordance with an exemplary embodiment of the disclosed subject matter.
Figure 6B:
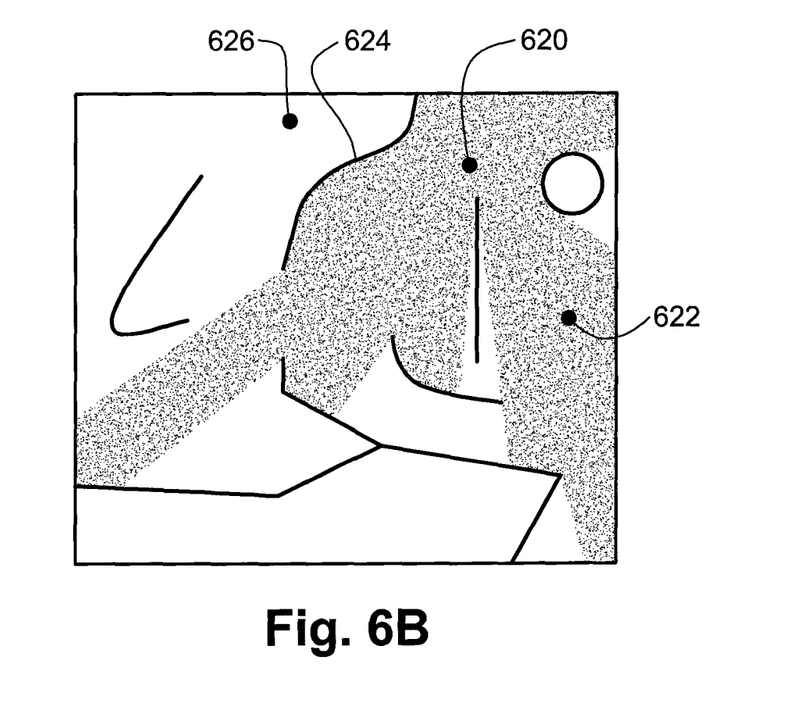

Referring now to FIGS. 6A and 6B, illustrating the result of the methods described above. Both figures show visibility of points from different viewpoints. Visible points are shown in gray, while non-visible points are shown in white. FIG. 6A shows viewpoint 610 and a plurality of points near viewpoint 610. Some points, such as point 612, are visible from viewpoint 610. Obstacles, such as obstacle 614, prevent visibility of other points near point 610. One example for a non-visible point is point 616, hidden behind an obstacle. FIG. 6B shows the same obstacles as in FIG. 6A and a different viewpoint 620. Hence, the visibility of points differs, by the number of points, as well as their location. Visible point 622 is not visible in the same location in FIG. 6A, while non-visible point 626 is visible in the same location in FIG. 6A.

Figure 7:
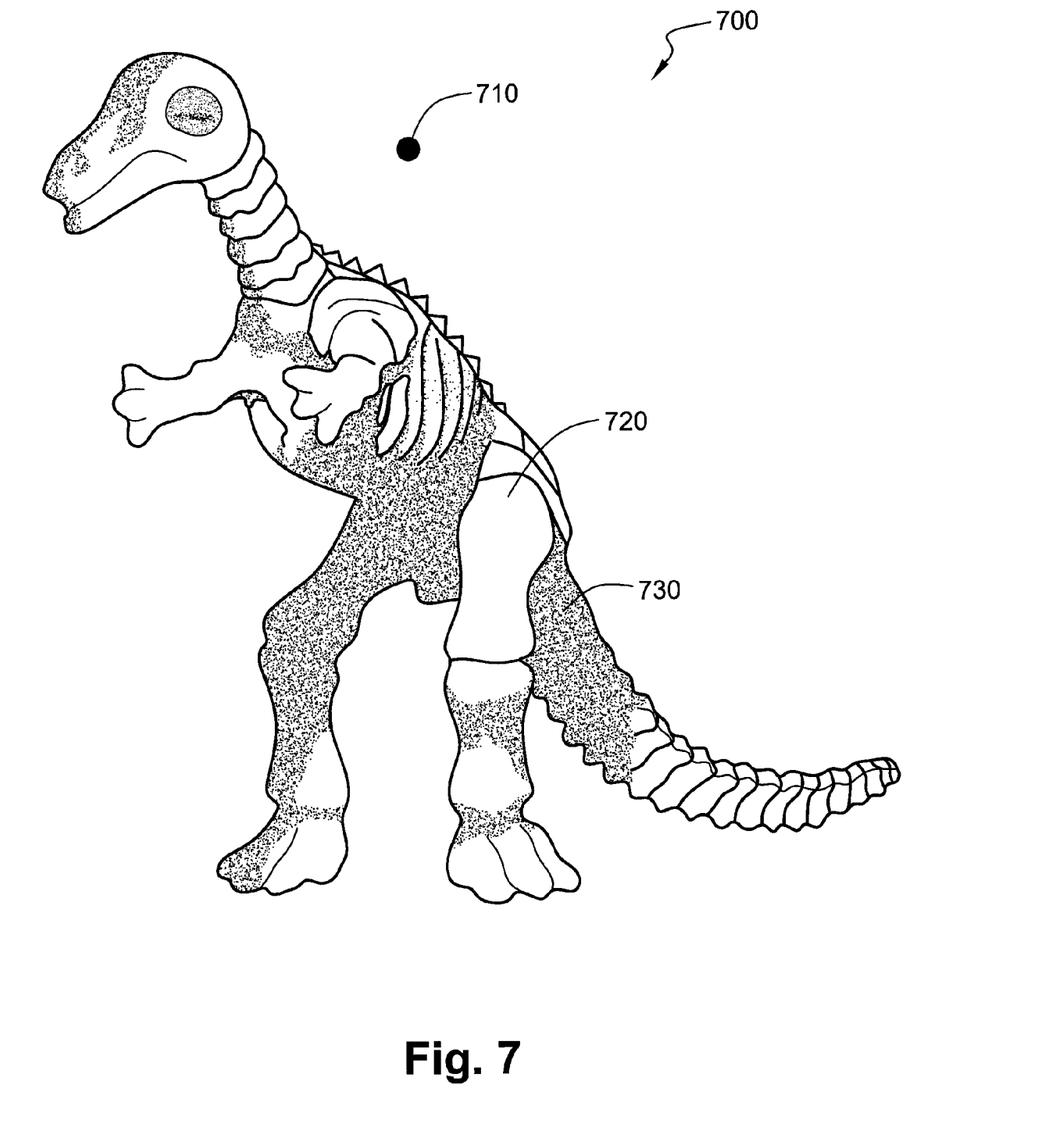

FIG. 7, illustrates shadow casting of an image, performed after visibility determination as described above. Shadow casting is provided according to the visibility determination, since visibility can be transformed into an amount of light emitted to a point. For example, in case a point in a point cloud is visible, it may indicate that the sun or another light source lights the point or points in its vicinity. In other implementation of visibility determination, a visible point may be colored to better distinguish the visible point from other point. FIG. 7 shows dinosaur 700 viewed from viewpoint 710. Visible points, such as point 720, are colored white, while non-visible points such as point 730 are colored in a dark color, such as black. Coloring pixels or points in an object as a function of the points' visibility is parallel to determining shadow casting, since visibility from one viewpoint has a similar effect to light emitted from the same view point on an object. The points that are visible from a viewpoint have correspond to points that are illuminated in case a light source resides in the viewpoint.

One technical effect of the subject matter is the ability to determine visibility for both dense point clouds and sparse point clouds without creating a new image or creating a three-dimensional surface.

Another technical effect is that the algorithm disclosed above can be applied on multi-dimensional representations. In such cases, the complexity of generating a convex hull is higher than O(n log n). In both cases, known methods such as reconstruction or image rendering are generally difficult and time consuming.

Another technical effect is that the methods described above are independent from change in the rotation or field of view of a camera or another image processing device used for capturing image data. Hence, the method and system of the disclosed subject matter do not require visibility recalculation. The viewpoint can be positioned either within or outside the point cloud.

One aspect of the invention is that it adaptively defines the shape of a region between a point and a viewpoint, which indicates the amount of visibility. In other words, "how much" of a point is visible.

The methods described above are computationally less complex. The first stage of the algorithm, inversion, requires runtime of O(n). The second stage, convex hull computation, requires runtime of O(n log n). Therefore, the asymptotic complexity of the algorithm is O(n log n).

Another technical effect of the subject matter is the ability to distinguish between two possible positions that produce very similar projections—looking towards or away from the camera. This ability is achieved by determining which points in a 3D object are visible and which points are hidden. By removing the hidden points from the image, or data related to the hidden points from the image, the only pixels displayed are those viewed from the specific viewpoint. Hence, in case the face is shown from a specific point of view, it can be indicated, either automatically or by a human, whether an object faces a viewpoint or not.

Another technical effect in the subject matter is the ability to determine the desired location of cameras. This is achieved by determining points visibility from multiple locations using the above described method, and comparing the number or percentage of visible points in each location. For example, in case one location has 22 visible points, it is preferred on another location with 18 visible points.

The invention can be extended to 3D or to any other number of dimensions. In 3D, instead of using two neighboring points, several neighboring points define the surface enclosing the empty volume. However, the algorithm of the disclosed subject matter uses the same convex hull construction.

Another technical effect of the disclosed subject matter is the ability to determine the amount of light falling on a surface, which takes into account not only the light fallen directly from a light source as performed when determining direct illumination, but also light which has undergone reflection from other surfaces in the world as performed when determining indirect illumination. Direct illumination can be obtained using the methods for determining points visibility to determine the visibility between a point source of light and the illuminated surface. Indirect illumination can be obtained using the same methods to determine the visibility between a first surface acting as a source of reflecting light and a second surface that is being illuminated. The global illumination of a surface can be determined as a function of the direct illumination and the indirect illumination determined using the methods described above.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

The invention claimed is:

1. A method for determining an optimal location for positioning an image capturing device within a volume from a pre-selected set of multiple locations, the method comprising:
   obtaining a plurality of points to be visible from the image capturing device; performing inversion on points located in the vicinity of the plurality of points thus creating a computerized inversed object, each point in the vicinity of the plurality of point is translated to a corresponding point in the computerized inversed object, wherein the inversion is a monotonically decreasing function depending on the distance of a point of the computerized object from the viewpoint;
   defining a convex hull of the inversed object and the viewpoint;
   determining visibility of a point of the plurality of points from a determined viewpoint according to the position of the corresponding point on the convex hull relative to neighbor points of the point;
   repeating said determining for each location from the pre-selected set of multiple locations of the determined viewpoint within the volume, determining whether the plurality of points are visible from each location;
   selecting the optimal location of the image capturing device based on the results of said repeated determining;
   wherein the computerized method is performed by a general purpose computer having processor.

2. The method according to claim 1, wherein determining visibility of the plurality of points by indicating the number or percentage of visible points of the plurality of points is higher than a threshold.

3. The method according to claim 1, wherein the number of points of the plurality of points that are visible from the determined location is higher than the number of points in the plurality of points that are visible from other locations.

4. The method according to claim 1, further comprising, a step of applying an at least one condition on the corresponding point of the specific point before determining that the specific point is visible.

5. The method according to claim 4, wherein the at least one condition is comparing an angle between the corresponding point of the specific point and two neighboring points in a point set composing the convex hull to a predetermined value; a line between the corresponding point and the viewpoint divides the angle.

6. The method according to claim 1, further comprising a step of receiving an indication that a specific point of the plurality of points is not determined visible from the viewpoint and removing the specific point from the plurality of points accordingly.

7. The method according to claim 1, wherein determining shadow casting of the specific point by determining the specific point is visible from a viewpoint representing a light source.

8. The method according to claim 1, wherein the inversion is a spherical inversion.

9. The method according to claim 1, wherein the method is applied to a three dimensional point cloud representation of the image.

10. A method for determining the amount of light falling on a specific point, the method comprises:
    performing inversion on points located in the vicinity of the specific point thus creating a computerized inversed object, each point in the vicinity of the specific point is translated to a corresponding point in the computerized inversed object wherein the inversion is a monotonically decreasing function depending on the distance of a point of the computerized object from the viewpoint;
    defining a convex hull of the inversed object;
    determining if the specific point is visible from the viewpoint according to the position of its corresponding point on the convex hull;
    determining direct illumination by determining visibility of the at least one point from a first set of points acting as a light source;
    locating a second set of points that are determined to be visible from the first set of points;
    determining indirect illumination by determining visibility of the at least one point from the second set of points acting as a source of reflecting light;
    setting the amount of light falling on the at least one point based on it being directly illuminated or indirectly illuminated;
    wherein the computerized method is performed by a general purpose computer having a processor.

11. The method according to claim 10, wherein the inversion is a spherical inversion.

12. The method according to claim 10, wherein the method is applied to a three dimensional point cloud representation of the image.

* * * * *